(12) United States Patent
Rodriguez

(10) Patent No.: US 6,947,832 B2
(45) Date of Patent: Sep. 20, 2005

(54) ERROR INTEGRATOR FOR CLOSED-LOOP FAULT DETECTION IN AN ENGINE CONTROL SYSTEM

(75) Inventor: Rogelio Rodriguez, Plainfield, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/775,790

(22) Filed: Feb. 10, 2004

(65) Prior Publication Data

US 2005/0177302 A1 Aug. 11, 2005

(51) Int. Cl.[7] ............................................. F02D 41/22
(52) U.S. Cl. ....................................... 701/114; 700/79
(58) Field of Search ............ 701/107, 114; 700/79–82; 123/359

(56) References Cited

U.S. PATENT DOCUMENTS 4,214,308 A * 7/1980 Carp .......................... 701/114
4,854,283 A * 8/1989 Kiyono et al. ............... 123/361
5,094,214 A * 3/1992 Kotzan ........................ 123/479
5,191,867 A    3/1993 Glassey
5,357,912 A   10/1994 Barnes et al.
5,485,820 A    1/1996 Iwaszkiewicz

* cited by examiner

Primary Examiner—Andrew M. Dolinar
(74) Attorney, Agent, or Firm—Dennis Kelly Sullivan; Susan L. Lukasik; Jeffrey P. Calfa

(57) ABSTRACT

Fault monitor (20) for error input (ICPC_ERR) to closed-loop control (16) of an engine function, such as a control pressure for a fuel system (12). Error input is derived from the desired and actual data values for the function. An integration function integrates the absolute value of the input data value (22, 24, 26, 28) during a time interval defined by a timing function (38, 40, 42, 44) to provide an integrated data value. A comparison function (34) compares the integrated data value and a data value ICPC_OBD_ERR defining a fault indication.

14 Claims, 1 Drawing Sheet

US 6,947,832 B2

ERROR INTEGRATOR FOR CLOSED-LOOP FAULT DETECTION IN AN ENGINE CONTROL SYSTEM

FIELD OF THE INVENTION

This invention relates to internal combustion engines, especially to fault detection in control systems of such engines.

BACKGROUND OF THE INVENTION

A known electronic engine control system comprises a processor-based engine controller that processes data from various sources to develop control data for controlling certain functions of the engine, including fueling of the engine by injection of fuel into engine combustion chambers. Control of engine fueling involves various considerations, one of which is controlling the pressure at which fuel is injected into the combustion chambers.

A diesel engine operates by the injection of fuel at relatively high hydraulic pressure. Hydraulic fluid under pressure, such as oil that is being pumped by an engine-driven oil pump to create a head pressure, is supplied to fuel injectors for use as the source of injection pressure. A fuel injector may amplify the head pressure, such by an intensifier piston, to inject a charge of fuel at a pressure corresponding to the product of hydraulic head pressure and intensifier piston amplification factor.

The head pressure of the oil is closely regulated, such as by a closed-loop control that continually seeks to null an error signal input corresponding to the difference between a desired control pressure and the actual head pressure.

Various modes of engine operation and various transients cause differences between desired control pressure and actual head pressure that change the magnitude of the error signal input to the closed-loop control. The error can also fluctuate both positively and negatively. Errors can range between relatively smaller ones and relatively larger ones. For example, certain transients in engine operation may cause relatively large error values, while other transients may cause only relatively small error values. Moreover, error changes may occur for reasons other than transients in engine operation and intentional changes in desired control pressure. Example of that are faults in sensors and/or processors.

In addition to increases in the magnitude of error, the durations of such increases can also have significance for proper pressure control. A smaller increase in error that has relatively longer duration may have as much significance as a larger increase of shorter duration.

In an engine that uses complex control technology, fault monitoring and logging are important for various reasons, including engine service, diagnostic testing, and compliance with applicable laws and regulations. It therefore becomes appropriate to monitor the head pressure of the hydraulic fluid that provides the pressure source for injection of fuel oil and to log certain faults that may be indicated in that pressure.

SUMMARY OF THE INVENTION

Briefly, the present invention relates to improvements in fault monitoring in control systems of internal combustion engines.

Accordingly, a generic aspect of the invention relates an internal combustion engine comprising a control system for closed-loop control of an engine function that is appropriate for fault monitoring. A data source provides a desired data value for the function, and a data source provides an actual data value for the function. An input data value to the control system is derived from the desired and actual data values for the function. A fault monitoring system monitors the input data value over a time interval by a timing function that defines the time interval, an integration function that integrates the absolute value of the input data value during the time interval to provide an integrated data value, and a comparison function that compares the integrated data value and a data value defining a fault indication.

Another generic aspect relates to the control system that has just been described.

Still another generic aspect relates to the method that is performed by the engine and control system just described.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
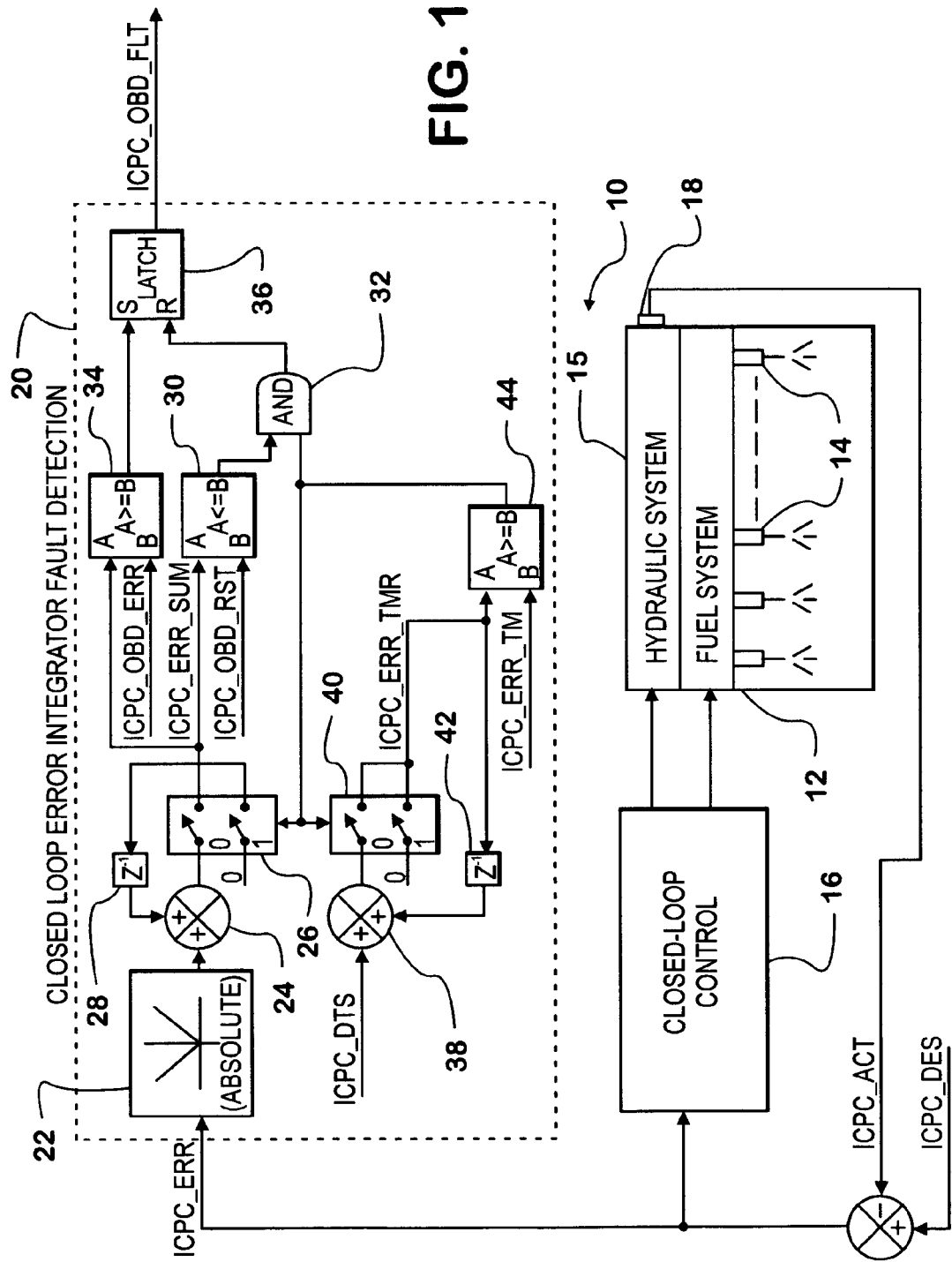
FIG. 1 is a general schematic diagram of a portion of an exemplary diesel engine and software strategy diagram relevant to an understanding of general principles of the invention.

FIG. 1 shows a diesel engine 10 comprising a fuel system 12 and a processor-based engine control system that processes data from various sources to develop various control data for controlling various aspects of engine operation, including control of engine fueling performed by fuel system 12. Data processed by the engine control system may originate at external sources, such as sensors, and/or be generated internally.

Fuel system 12 injects fuel into combustion chambers of engine 10 via fuel injectors 14, each of which mounts on engine 10 in association with a respective engine cylinder. Control of engine fueling involves control of various factors, including the timing and duration of electric signals that open and close the fuel injectors and the pressure at which the fuel is injected. The engine control system is capable of processing data sufficiently fast to set both the timing and the amount of fueling for accurately accomplishing desired fueling.

For accurate fueling, the engine control system also controls the pressure at which fuel is injected. Because diesel fuel is typically injected at relatively high pressure, the control of pressure is actually performed by control of the pressure of hydraulic fluid, i.e. oil, that is supplied to the fuel injectors, as mentioned above via a hydraulic, or oil, system 15.

An example of a strategy for pressure control is a closed-loop control 16 where the difference between a desired control pressure ICPC_DES set by the engine control system responding to certain data inputs and actual control pressure ICPC_ACT obtained from a source, such as a pressure sensor 18, forms an error input ICPC_ERR that is processed by closed-loop control algorithms to control one or more devices in system 15 that influence the hydraulic pressure of the oil supplied to fuel injectors 14. Control 16 strives to secure correspondence of actual control pressure to desired control pressure.

A fault detection strategy 20 for monitoring the control pressure error input in accordance with principles of the present invention is contained in the engine control system and comprises an absolute value function 22 that provides an output data value corresponding to the absolute value of the error input. That output data value forms one input to a summing function 24 whose data value output forms one input to a switch function 26.

When switch function 26 is OFF, the data value output of summing function 24 is stored in a store 28. When switch function 26 is ON, a zero data value is stored in store 28.

The data value stored in store 28 forms a second input to summing function 24. Consequently, when switch function 26 is OFF, the absolute value of the error input is effectively integrated, with the data value of the integral being the data value of the parameter designated ICPC_ERR_SUM. When switch function 26 is ON, the integration stops.

ICPC_ERR_SUM is an input to a comparison function 30 that compares the data value for ICPC_ERR_SUM with the data value for a parameter ICPC_OBD_RST. When the data value for ICPC_ERR_SUM is less than or equal to the data value for ICPC_OBD_RST, function 30 applies a logic "0" to one input of an AND logic function 32. When the data value for ICPC_ERR_SUM is greater than the data value for ICPC_OBD_RST, function 30 applies a logic "1" to that input of AND logic function 32.

ICPC_ERR_SUM is also an input to another comparison function 34 that compares the data value for ICPC_ERR_SUM with the data value for a parameter ICPC_OBD_ERR. When the data value for ICPC_ERR_SUM is greater than or equal to the data value for ICPC_OBD_ERR, function 34 applies a logic "1" to the set input S of a latch function 36. When the data value for ICPC_ERR_SUM is less than the data value for ICPC_OBD_ERR, function 34 applies a logic "0" to the set input S of latch function 36.

A parameter ICPC_DTS is another input to the fault detection strategy 20, specifically an input to a summing function 38 whose data value output forms one input to a switch function 40.

When switch function 40 is OFF, the data value output of summing function 38 is stored in a store 42. When switch function 40 is ON, a zero data value is stored in store 42. The data value stored in store 42 forms a second input to summing function 38. Consequently, when switch function 40 is OFF, the data value for ICPC_DTS is in effect integrated, with the data value of the integral being the data value of the parameter designated ICPC_ERR_TMR. When switch function 40 is ON, the integration stops.

The data value for ICPC_ERR_TMR measures the duration of a time interval during which the error signal ICPC_ERR is integrated. The strategy executes at an execution rate that is fast enough to accurately track changes in ICPC_ERR so that the integration being performed is sufficiently accurate. By setting a certain data value for ICPC_DTS and executing the strategy at a constant execution rate, the data value for ICPC_ERR_TMR will proportionally increase with time thereby providing a sufficiently accurate measurement of a time interval over which the integration of the error signal is occurring.

The duration of the time interval is set by the data value of a parameter ICPC_ERR_TM that forms one input to a comparison function 44 that compares the data value for ICPC_ERR_TM with the data value for ICPC_ERR_TMR. When the data value for ICPC_ERR_TMR is greater than or equal to the data value for ICPC_ERR_TM, function 44 applies a logic "1" to a second input of AND logic function 32. When the data value for ICPC_ERR_TMR is less than the data value for ICPC_ERR_TM, function 44 applies a logic "0" to the second input of AND logic function 32.

The data value for the output of function 44 also controls the conditions of switch functions 26 and 40. When the data value for the output of function 44 is a logic "0", switch functions 26 and 40 are turned OFF. When the data value for the output of function 44 is a logic "1", switch functions 26 and 40 are turned ON.

The AND logic function 32 controls the resetting of latch function 36. When the data output of AND logic function 32 is a logic "0", latch function 36 can be set. When the data output of AND logic function 32 is a logic "0", latch function 36 is forced to reset condition.

When latch function 36 is in reset condition, its data output designated by the parameter ICPC_OBD_FLT is forced to a logic "0", indicating absence of a fault. When latch function 36 is in set condition, ICPC_OBD_FLT is forced to a logic "1", indicating a fault.

A fault monitoring timing interval commences whenever switch functions 26 and 40 are switched from ON to OFF, such as when an immediately previous timing interval expires and the new timing interval commences. If latch function 36 had been set during the previous timing interval, it is reset by AND logic function 32 at the commencement of the new timing interval. Should the integrated absolute value of the error signal exceed an error defined by ICPC_OBD_ERR during the new time interval, latch function 36 will be set to indicate a fault that is logged by the control system.

Various data, that may include data such as engine speed data and acceleration pedal position data, are processed by various algorithms in the engine control system to set engine fueling, with the control pressure of the oil supplied to fuel injectors 14 being one function that is regulated to assure proper injection. The invention enables the control pressure to be monitored both at any time and over a calibratable time interval, the latter by making the data value for ICPC_DTS programmable to set any appropriate time interval. Because the absolute value of ICPC_ERR is the value being integrated, negative errors will not cancel positive errors. Error can be integrated during both steady state and transient engine operation.

Whether an error is indicated and logged as a fault is determined both by the time interval defined by the data value for ICPC_DTS and the data value for ICPC_OBD_ERR. The latter is also a settable parameter.

While certain principles of the invention are specific to fault monitoring and detection of control pressure, it is believed that the invention can be useful for fault monitoring and detection in other engine systems, especially where there is a need or desire to set various time intervals and various fault values.

While a presently preferred embodiment of the invention has been illustrated and described, it should be appreciated that principles of the invention apply to all embodiments falling within the scope of the following claims.

What is claimed is:

1. An internal combustion engine comprising:
   a control system for closed-loop control of an engine function that is appropriate for fault monitoring;
   a data source providing a desired data value for the function;

a data source providing an actual data value for the function;

an input data value to the control system that is derived from the desired and actual data values for the function and that at times is positive and at times is negative;

a fault monitoring system for monitoring the input data value over a time interval during which the input data value is at times positive and at times negative comprising a timing function defining the time interval, an integration function that integrates the absolute value of the input data value during the time interval to provide an integrated data value, and a comparison function for comparing the integrated data value and a data value defining a fault, wherein the fault monitoring system further comprises a reset function for resetting the fault monitoring system upon expiration of the time interval.

2. An internal combustion engine comprising:

a control system for closed-loop control of an engine function that is appropriate for fault monitoring;

a data source providing a desired data value for the function;

a data source providing an actual data value for the function;

an input data value to the control system that is derived from the desired and actual data values for the function and that at times is positive and at times is negative;

a fault monitoring system for monitoring the input data value over a time interval during which the input data value is at times positive and at times negative comprising a timing function defining the time interval, an integration function that integrates the absolute value of the input data value during the time interval to provide an integrated data value, and a comparison function for comparing the integrated data value and a data value defining a fault, An wherein the engine function is a hydraulic control pressure associated with a fuel system of the engine.

3. An engine as set forth in claim 2 wherein the fault monitoring system further comprises a latch function that operates to latched condition when the result of comparing the integrated data value and a data value defining a fault indicates that the integrated data value is greater than or equal to the data value defining a fault.

4. An engine as set forth in claim 3 wherein the data value defining a fault is a programmable parameter of the engine control system.

5. An engine as set forth in claim 2 wherein the time interval is a programmable parameter of the control system.

6. A control system for closed-loop control of an engine function that is appropriate for fault monitoring in an internal combustion engine, the control system comprising:

a data source providing a desired data value for the function;

a data source providing an actual data value for the function;

an input data value that is derived from the desired and actual data values for the function and that at times is positive and at times is negative;

a fault monitoring system for monitoring the input data value over a time interval during which the input data value is at times positive and at times negative comprising a timing function defining the time interval, an integration function that integrates the absolute value of the input data value during the time interval to provide an integrated data value, and a comparison function for comparing the integrated data value and a data value defining a fault, wherein the fault monitoring system further comprises a reset function for resetting the fault monitoring system upon expiration of the time interval.

7. A control system as set forth in claim 6 wherein the fault monitoring system further comprises a latch function that operates to latched condition when the result of comparing the integrated data value and a data value defining a fault indicates that the integrated data value is greater than or equal to the data value defining a fault.

8. A control system as set forth in claim 7 wherein the data value defining a fault is a programmable parameter in the control system.

9. A control system as set forth in claim 6 wherein the time interval is a programmable parameter in the control system.

10. A method for fault monitoring in an internal combustion engine control system that provides closed-loop control of an engine function, the method comprising:

processing a desired data value for the function and an actual data value for the function to develop values of error data for the closed-loop control of the function, which values of error data are at times positive and at times negative;

monitoring the error data values over a time interval during which the error data value is at times positive and at times negative and which is defined by a timing function by integrating the absolute values of the error data values during the time interval to provide an integrated data value, and comparing the integrated data value and a data value defining a fault, further comprising resetting the fault monitoring system upon expiration of the time interval.

11. A method for fault monitoring in an internal combustion engine control system that provides closed-loop control of an engine function, the method comprising:

processing a desired data value for the function and an actual data value for the function to develop values of error data for the closed-loop control of the function, which values of error data are at times positive and at times negative;

monitoring the error data values over a time interval during which the error data value is at times positive and at times negative and which is defined by a timing function by integrating the absolute values of the error data values during the time interval to provide an integrated data value, and comparing the integrated data value and a data value defining a fault, further comprising providing a data value for desired hydraulic control pressure as the desired data value for the function and providing a data value for actual hydraulic control pressure as the actual data value for the function.

12. A method as set forth in claim 11 further comprising operating a latch function to latched condition when the comparison of the integrated data value and a data value defining a fault indicates that the integrated data value is greater than or equal to the data value defining a fault.

13. A method as set forth in claim 12 further comprising programming into the control system a desired data value for the data value defining a fault.

14. A method as set forth in claim 11 further comprising programming into the control system a desired data value for the time interval.

* * * * *